United States Patent
Frankel

(10) Patent No.: US 8,761,610 B2
(45) Date of Patent: Jun. 24, 2014

(54) METHODS AND SYSTEMS FOR THE PERFORMANCE ANALYSIS OF FIBER OPTIC NETWORKS

(75) Inventor: Michael Y. Frankel, Baltimore, MD (US)

(73) Assignee: Ciena Corporation, Hanover, MD (US)

( * ) Notice: Subject to any disclaimer, the term of this patent is extended or adjusted under 35 U.S.C. 154(b) by 1426 days.

(21) Appl. No.: 11/328,810

(22) Filed: Jan. 10, 2006

(65) Prior Publication Data

US 2007/0166032 A1 Jul. 19, 2007

(51) Int. Cl.
*H04B 10/00* (2013.01)

(52) U.S. Cl.
USPC .................. 398/158; 398/9; 398/20; 398/141

(58) Field of Classification Search
USPC ......................................... 398/141, 158, 9, 20
See application file for complete search history.

(56) References Cited

U.S. PATENT DOCUMENTS

| | | | | |
|---|---|---|---|---|
| 5,510,917 A * | 4/1996 | Corke et al. | ................... | 398/34 |
| 5,654,816 A * | 8/1997 | Fishman | ................... | 359/349 |
| 6,359,708 B1 * | 3/2002 | Goel et al. | ................... | 398/15 |
| 6,392,769 B1 * | 5/2002 | Ford et al. | ................... | 398/9 |
| 6,529,316 B1 * | 3/2003 | Treyz et al. | ................... | 359/337.11 |
| 6,538,787 B1 * | 3/2003 | Moeller et al. | ................... | 398/158 |
| 6,545,980 B1 * | 4/2003 | Dive et al. | ................... | 370/242 |
| 6,556,617 B1 * | 4/2003 | Tsujimoto | ................... | 375/141 |
| 6,583,899 B1 * | 6/2003 | Casanova et al. | ................... | 398/9 |
| 6,594,428 B1 * | 7/2003 | Tanaka et al. | ................... | 385/123 |
| 6,603,585 B2 * | 8/2003 | Manna et al. | ................... | 398/158 |
| 6,687,443 B2 * | 2/2004 | Kubo et al. | ................... | 385/123 |
| 6,802,021 B1 * | 10/2004 | Cheng et al. | ................... | 714/4 |
| 6,807,370 B2 * | 10/2004 | Harasawa | ................... | 398/13 |
| 6,819,479 B1 * | 11/2004 | Islam et al. | ................... | 359/337 |
| 6,885,820 B2 * | 4/2005 | Eder et al. | ................... | 398/26 |
| 6,911,645 B2 * | 6/2005 | Beger et al. | ................... | 250/227.19 |
| 6,947,668 B1 * | 9/2005 | Koeppen et al. | ................... | 398/16 |
| 6,952,529 B1 * | 10/2005 | Mittal | ................... | 398/26 |
| 6,980,737 B1 * | 12/2005 | Anslow et al. | ................... | 398/27 |
| 7,039,272 B2 * | 5/2006 | Uda | ................... | 385/24 |
| 7,058,311 B1 * | 6/2006 | Islam et al. | ................... | 398/140 |

(Continued)

OTHER PUBLICATIONS

S. Betti, M. Giaconi, and M. Nardini; "Effect of Four-Wave Mixing on WDM Optical Systems: A Statistical Analysis"; IEEE Photonics Technology Letters; vol. 15, No. 8, pp. 1079-1081, Aug. 2003; Rome, Italy.

(Continued)

*Primary Examiner* — Danny Leung
(74) *Attorney, Agent, or Firm* — Clements Bernard PLLC; Christopher L. Bernard; Lawrence A. Baratta, Jr.

(57) ABSTRACT

In general, the present invention provides novel approaches to signal propagation modeling that utilize the following: 1) geographic segmentation is applied by separating a large fiber optic network into individual non-overlapping segments, defined by optical add/drop placements; 2) impairment segmentation is applied, such that optical noise, self-phase, cross-phase, four-wave mixing, and other impairments are all treated separately; 3) each impairment is calculated by the most efficient approach to achieve the minimum required accuracy, the approaches being fully numeric, semi-analytic, or empirical; 4) impairment concatenation rules are applied to compute an overall impairment experienced by a signal that traverses more than one segment; and 5) impairment scaling rules are applied to rapidly estimate changes in configuration that can lead to improved performance (i.e. higher capacity, longer distance, or lower cost).

20 Claims, 8 Drawing Sheets

(56) References Cited

U.S. PATENT DOCUMENTS

| | | | |
|---|---|---|---|
| 7,103,283 B2* | 9/2006 | Mikami et al. | 398/159 |
| 7,153,034 B2* | 12/2006 | Sasaoka et al. | 385/71 |
| 7,155,120 B1* | 12/2006 | Ofek et al. | 398/7 |
| 7,215,464 B1* | 5/2007 | Komaki et al. | 359/341.44 |
| 7,233,432 B2* | 6/2007 | Islam et al. | 359/337 |
| 7,242,864 B2* | 7/2007 | Muzicant et al. | 398/37 |
| 7,280,768 B2* | 10/2007 | Zaacks et al. | 398/193 |
| 7,295,783 B2* | 11/2007 | Singh et al. | 398/175 |
| 7,359,645 B2* | 4/2008 | Miyashita et al. | 398/147 |
| 7,369,300 B2* | 5/2008 | Sridhar et al. | 359/337.13 |
| 7,400,830 B2* | 7/2008 | Torii et al. | 398/34 |
| 7,512,345 B2* | 3/2009 | Yamada | 398/147 |
| 2001/0008452 A1* | 7/2001 | Sugihara et al. | 359/124 |
| 2002/0048062 A1* | 4/2002 | Sakamoto et al. | 359/124 |
| 2002/0060821 A1* | 5/2002 | Manna et al. | 359/124 |
| 2002/0131115 A1* | 9/2002 | Kasahara | 359/124 |
| 2002/0154359 A1* | 10/2002 | Tsuda et al. | 359/124 |
| 2003/0081292 A1* | 5/2003 | Mikami et al. | 359/161 |
| 2003/0128979 A1* | 7/2003 | Kitajima et al. | 398/12 |
| 2004/0004709 A1* | 1/2004 | Pitchforth, Jr. | 356/73.1 |
| 2004/0052524 A1* | 3/2004 | Arnold | 398/38 |
| 2004/0076430 A1* | 4/2004 | Zaacks et al. | 398/27 |
| 2004/0135676 A1* | 7/2004 | Berkman et al. | 340/310.01 |
| 2004/0146306 A1* | 7/2004 | Muzicant et al. | 398/177 |
| 2004/0170429 A1* | 9/2004 | Mahlab et al. | 398/33 |
| 2004/0173731 A1* | 9/2004 | Beger et al. | 250/226 |
| 2004/0190899 A1* | 9/2004 | Torii et al. | 398/33 |
| 2004/0208172 A1* | 10/2004 | Ovadia et al. | 370/360 |
| 2004/0208535 A1* | 10/2004 | Bragg et al. | 398/38 |
| 2004/0227621 A1* | 11/2004 | Cope et al. | 340/310.01 |
| 2005/0226629 A1* | 10/2005 | Ooi et al. | 398/147 |
| 2005/0244164 A1* | 11/2005 | Miyashita et al. | 398/147 |
| 2006/0097573 A1* | 5/2006 | Gidge et al. | 307/3 |
| 2007/0166032 A1* | 7/2007 | Frankel | 398/9 |

OTHER PUBLICATIONS

Wolfgang Zeiler, Fabrizio Di Pasquale, Polina Bayvel, and John E. Midwinter; "Modeling of Four-Wave Mixing and Gain Peaking in Amplified WDM Optical Communication Systems and Networks"; Journal of Lightwave Technology, vol. 14, No. 9, Sep. 1996.

Shu Yamamoto, Noboru Edagawa, Hidenora Taga, Yoshihiro Yoshida and Hiroharu Wakabayashi; "Analysis of Laser Phase Noise to Intensity Noise Conversion by Chromatic Dispersion in Intensity Modulation and Direct Detection Optical-Fiber Transmission"; Journal of Lightwave Technology, vol. 8, No. 11, Nov. 1990; Japan.

Kyo Inoue, Kenji Nakanishi, Kazuhiro Oda and Hiromu Toba; Crosstalk and Power Penalty Due to Fiber Four-Wave Mixing in Multichannel Transmissions; Journal of Lightwave Technology, vol. 12, No. 8, Aug. 1994; Japan.

Rongqing Hui, Kenneth R. Demarest and Christopher T. Allen; "Cross-Phase Modulation in Multispan WDM Optical Fiber Systems"; Journal of Lightwave Technology, vol. 17, No. 6, Jun. 1999; Lawrence, Kansas.

F. N. Farokhrooz and J. P. Raina; Sensitivity Degradation Due to Fiber Dispersion-Induced PM-AM Noise in Optically Preamplified Direct Detection Systems; Department of Electrical Engineering, Indian Institute of Technology, Madras-36, India; (c) 1996 Chapman & Hall.

G. Goeger, M. Wrage and W. Fischler; "Cross-Phase Modulation in Multispan WDM Systems With Arbitrary Modulation Formats"; IEEE Photonics Technology Letters, vol. 16, No. 8, Aug. 2004; Munich, Germany.

* cited by examiner

METHODS AND SYSTEMS FOR THE PERFORMANCE ANALYSIS OF FIBER OPTIC NETWORKS

FIELD OF THE INVENTION

The present invention relates generally to the telecommunications and optical networking fields. More specifically, the present invention relates to methods and systems for the performance analysis of fiber optic networks.

BACKGROUND OF THE INVENTION

Wavelength multiplexed optical networks are continually increasing in both functionality and complexity. This increased functionality is driven by, among other things, the provision of optical add/drop multiplexers and optical switching elements that permit a rich variety wavelength connectivity and exchange between fibers and nodes in optical networks. The increased complexity is driven by, among other things, increasing bit rates of individual channels, increasing channel counts, increasing channel densities, and increasing transmission distances.

The demands placed by such optical networks on signal quality mandate the use of specialized tools to calculate signal impairments as they propagate between origination and termination points. These signal impairments are associated with a wide range of linear and nonlinear effects which can act on a single wavelength channel or couple multiple wavelength channels.

Conventional approaches to optical signal propagation modeling can be grouped into two broad categories. First, there are fully numeric approaches. These approaches solve electromagnetic wave propagation equations, and generally account for nonlinear effects in the propagation medium (i.e. fiber). The resources required for such approaches, including computer memory requirements and computational time, grow rapidly with increased system complexity. Given the current state of desktop computers, it takes several hours to simulate the propagation of a relatively few 10 Gb/s channels over ~1000 km of fiber. Desktop computer power is not sufficient for simulations involving more than ~16 channels of 10 Gb/s each. Typical commercial systems can have up to 192 channels of 10 Gb/s each, and a typical North American fiber network extends over ~25000 km. Further, network performance optimization can require propagation to be recomputed several times as an optimal solution is sought. For example, signal power can be changed, as well as the placement of signal conditioning elements, such as dispersion compensation modules, optical amplifiers, and the like, Signal channel spacing, bit rate, etc. can also be changed. Clearly, an alternative approach to optical signal propagation modeling is needed.

Second, there are semi-analytic or empirical approaches to optical signal propagation modeling. These approaches typically divide signal propagation into separate components, each component associated with a particular propagation effect. Examples of such propagation effects are Amplified Spontaneous Emission (ASE) noise accumulation associated with optical amplifiers, Self-Phase Modulation (SPM) associated with single-channel fiber nonlinearity, Cross-Phase Modulation (XPM) associated with a fiber nonlinearity coupling multiple adjacent channels, and the like. Each effect can be assumed to be independent of the others if each contributes only a small overall distortion to the signal. Calculations are typically carried out on a complete end-to-end link, starting at the point where an optical signal is generated and ending at the electrical receiver. In general, the semi-analytic or empirical approaches to optical signal propagation modeling provide computational efficiency, but sacrifice accuracy. One area of deficiency associated with these approaches involves their application to richly interconnected optical networks. A small change in one area of a network can impact optically coupled signals spanning a large geographic area, and thus require extensive recomputation.

In general, conventional approaches to optical signal propagation modeling have the following limitations which preclude their use in richly interconnected optical networks: 1) they assume that all wavelength signals have the same origination and termination points; 2) they account for non-linear effects simultaneously (i.e. no differentiation); 3) they are computationally impractical for systems with fully populated channels; 4) they make optimization very difficult, if not impossible, as small configuration changes require full recomputation; and 5) they do not lend themselves to distributed calculations (i.e. parallelized calculations).

Thus, what is needed is a novel approach that overcomes the above limitations, while still providing sufficient accuracy.

BRIEF SUMMARY OF THE INVENTION

In general, the approach of the present invention overcomes the above limitations, while still providing sufficient accuracy, via the following: 1) geographic segmentation is applied by separating a large fiber optic network into individual non-overlapping segments, defined by optical add/drop placements; 2) impairment segmentation is applied, such that optical noise, self-phase, cross-phase, four-wave mixing, and other impairments are all treated separately; 3) each impairment is calculated by the most efficient approach to achieve the minimum required accuracy, the approaches being fully numeric, semi-analytic, or empirical; 4) impairment concatenation rules are applied to compute an overall impairment experienced by a signal that traverses more than one segment; and 5) impairment scaling rules are applied to rapidly estimate changes in configuration that can lead to improved performance (i.e. higher capacity, longer distance, or lower cost).

In one exemplary embodiment of the present invention, a method for the performance analysis of fiber optic networks includes, given a fiber optic network of interest, applying geographic segmentation to the fiber optic network by separating the fiber optic network into a predetermined number of individual non-overlapping segments defined by one or more optical add/drop placements; given a plurality of impairments of interest, applying impairment segmentation to the plurality of impairments such that each of the plurality of impairments is treated separately; calculating each of the plurality of impairments using a predetermined method selected to achieve a predetermined minimum required accuracy; applying one or more concatenation rules to compute an overall impairment experienced by a signal that traverses more than one segment; and applying one or more impairment scaling rules to estimate changes in configuration that lead to improved fiber optic network performance.

In another exemplary embodiment of the present invention, a system for the performance analysis of fiber optic networks includes, given a fiber optic network of interest, a first algorithm operable for applying geographic segmentation to the fiber optic network by separating the fiber optic network into a predetermined number of individual non-overlapping segments defined by one or more optical add/drop placements; given a plurality of impairments of interest, a second algorithm operable for applying impairment segmentation to the plurality of impairments such that each of the plurality of impairments is treated separately; a third algorithm operable for calculating each of the plurality of impairments using a predetermined method selected to achieve a predetermined minimum required accuracy; a fourth algorithm operable for applying one or more concatenation rules to compute an overall impairment experienced by a signal that traverses more than one segment; and a fifth algorithm operable for applying one or more impairment scaling rules to estimate changes in configuration that lead to improved fiber optic network performance.

In a further exemplary embodiment of the present invention, a method for the performance analysis of fiber optic networks includes, given a fiber optic network of interest, separating the fiber optic network into a plurality of segments (geographic segmentation); performing an optical line amplifier (OLA) chain analysis of each of the plurality of segments; and performing an impairment analysis of each of the plurality of segments, wherein the impairment analysis includes a plurality of impairment sub-analyses, each of the plurality of impairment sub-analyses limited to an analysis of one predetermined impairment (impairment segmentation).

BRIEF DESCRIPTION OF THE DRAWINGS

The present invention is illustrated and described herein with reference to the various drawings, in which like reference numbers denote like method steps and/or system components, and in which.

DETAILED DESCRIPTION OF THE INVENTION

In general, the present invention provides novel approaches to signal propagation modeling that utilize the following: 1) geographic segmentation is applied by separating a large fiber optic network into individual non-overlapping segments, defined by optical add/drop placements; 2) impairment segmentation is applied, such that optical noise, self-phase, cross-phase, four-wave mixing, and other impairments are all treated separately; 3) each impairment is calculated by the most efficient approach to achieve the minimum required accuracy, the approaches being fully numeric, semi-analytic, or empirical; 4) impairment concatenation rules are applied to compute an overall impairment experienced by a signal that traverses more than one segment; and 5) impairment scaling rules are applied to rapidly estimate changes in configuration that can lead to improved performance (i.e. higher capacity, longer distance, or lower cost).

The methods and systems of the present invention are best illustrated by first considering some specific conventional impairment examples. Optical Amplified Spontaneous Emission (ASE) noise accumulation associated with optical amplifiers can be expressed via Optical Signal-to-Noise Ratio (OSNR), which can be computed using a relatively simple equation, assuming uniform span distribution, as:

$$OSNR_{segment} = P_{ch} + 58 - L_{span} - 10\log(N_{span}) - NF, \quad (1)$$

where segment is defined as a potion of the network between two Optical Add/Drop Multiplexers (OADMs), $P_{ch}$ is the channel power launched into the fiber span, $L_{span}$ is the loss of a fiber span between two optical amplifiers, $N_{span}$ is the number of fiber spans comprising a segment, and NF is the noise figure of the optical amplifier. It should be noted that more complicated approaches to modeling $OSNR_{segment}$ rely on numeric or empirical solutions.

If a signal traverses more than one segment, overall OSNR can be computed via a concatenation equation, such as:

$$1/OSNR_{tot} = \Sigma_{allsegments}(1/OSNR_{segment\ i}). \quad (2)$$

Figure 1:
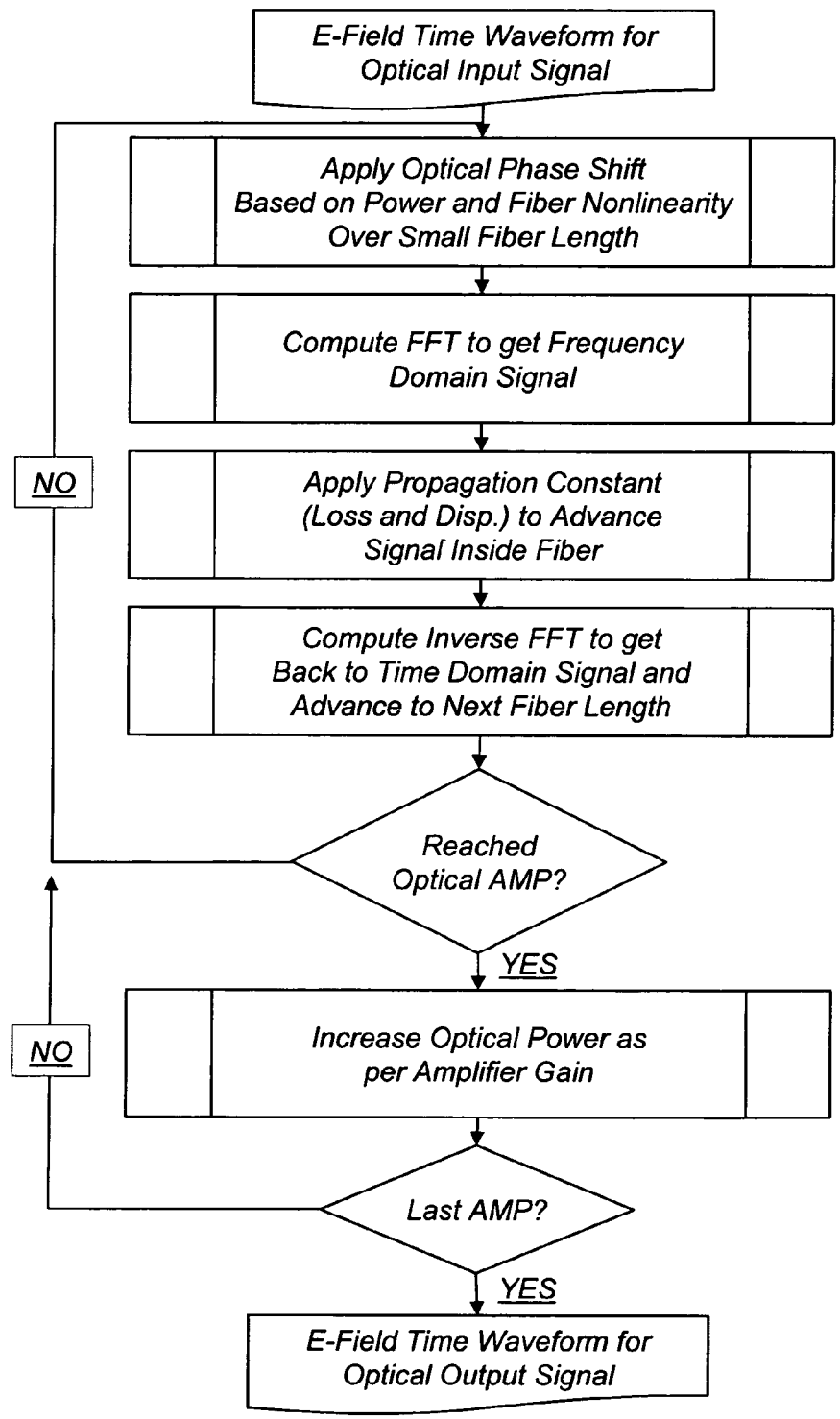
FIG. 1 is a flowchart illustrating a conventional Split Step Fourier numeric method, applied at a segment level, for characterizing a Self-Phase Modulation (SPM) impairment associated with a single channel fiber nonlinearity, which requires an accurate calculation of an optical waveform distortion as it propagates through a fiber.

Self-Phase Modulation (SPM) associated with single-channel fiber nonlinearity requires an accurate calculation of the optical waveform distortion as it propagates through the fiber. Thus, a typical approach requires a Split Step Fourier numeric method to be applied at the segment level, as illustrated in FIG. 1.

Figure 2:
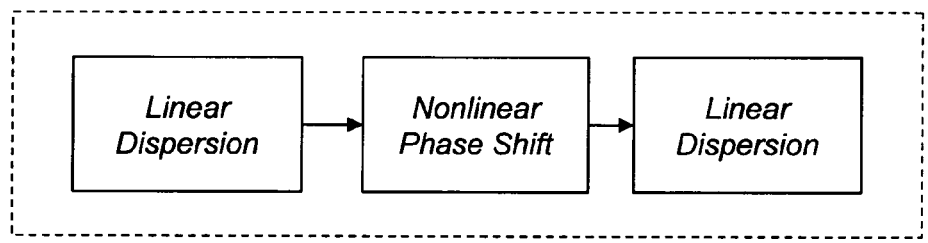
FIG. 2 is a schematic diagram illustrating another step in the method of FIG. 1, in accordance with the methods and systems of the present invention, specifically, subsequent to a calculation for each segment, the extraction of a simplified segment model, a simple form represented by three calculations.

Subsequent to a calculation for each segment, a simplified segment model is extracted from the results. A simple form is represented by three calculations, as illustrated in FIG. 2.

Signal propagation that spans multiple segments can be computed by a simple concatenation of individual segment models. Thus, a change in one segment only impacts the local model, and complete recalculation can be achieved rapidly and efficiently.

Other impairments, such as Cross-Phase Modulation (XPM) associated with a fiber nonlinearity coupling multiple adjacent channels, Four-Wave Mixing (FWM), Stimulated Raman Scattering (SRS), Multi-Path Interference MPI), Polarization Mode Dispersion (PMD), and the like are handled in a substantially similar manner.

For example, XPM-induced phase and amplitude impairments can be computed for separate segments, and concatenation of these impairments performed for multi-segment signal propagation, as described in "Cross-Phase Modulation in Multispan WDM Systems With Arbitrary Modulation Formats," G. Goeger, M. Wrage, and W. Fischler, IEEE Photon. Techn. Lett., Vol. 16, No. 8, August 2004, pp. 1858-1860; and in "Cross-Phase Modulation in Multispan WDM Optical Fiber Systems," R. Hui, K. Demarest, and C. T. Allen, J. Lightwave Techn., Vol. 17, No. 6, June 1999, pp. 1018-1026. Further, under some simplifying assumptions, the XPM-induced noise variance, $\sigma^2_{XPM}$, can be shown to scale with channel power, $P_{ch}$, and with channel spacing, $\Delta\lambda$, as shown in the following equation:

$$\sigma^2_{XPM} / P_s^2 \propto P_{ch}^2 / \Delta\lambda^2 \quad (3)$$

Rapid power and channel density optimization can be realized.

The impairment due to FWM can be computed and concatenated as described in "Effect of Four-Wave Mixing on WDM Optical Systems: A Statistical Analysis," S. Betty, M. Giaconi, and M. Nardini, IEEE Photon. Techn. Lett., Vol. 15, No. 8, August 2003, pp. 1079-1081. Further, under some simplifying assumptions, the FWM-induced noise variance, $\sigma^2_{XPM}$, can be shown to scale with channel power, $P_{ch}$, and with channel spacing, $\Delta\lambda$, as shown in the following equation:

$$\sigma^2_{XPM} / P_s^2 \propto P_{ch}^2 / \Delta\lambda^4 \quad (4)$$

Rapid power and channel density optimization can be realized.

MPI is related primarily to the physical imperfections and reflections encountered in deployed fiber optic links, and is measured as residual delayed signal power. It is generally independent of signal power and channel spacing. Concatenation is a simple addition of powers from each separate segment.

PMD is also generally independent of signal power and channel spacing, although some second-order interactions with nonlinear effects do exist. Concatenation of individual segment PMD can be done under the assumption of random accumulation, and is expressed by the following equation, with differential group delay between polarizations computed as:

$$DGD_{total} = \sqrt{\sum_{all\ segments} DGD^2_{segment\ i}} \quad (5)$$

Computation, concatenation, and scaling rules for other impairments can be similarly obtained.

Figure 4:
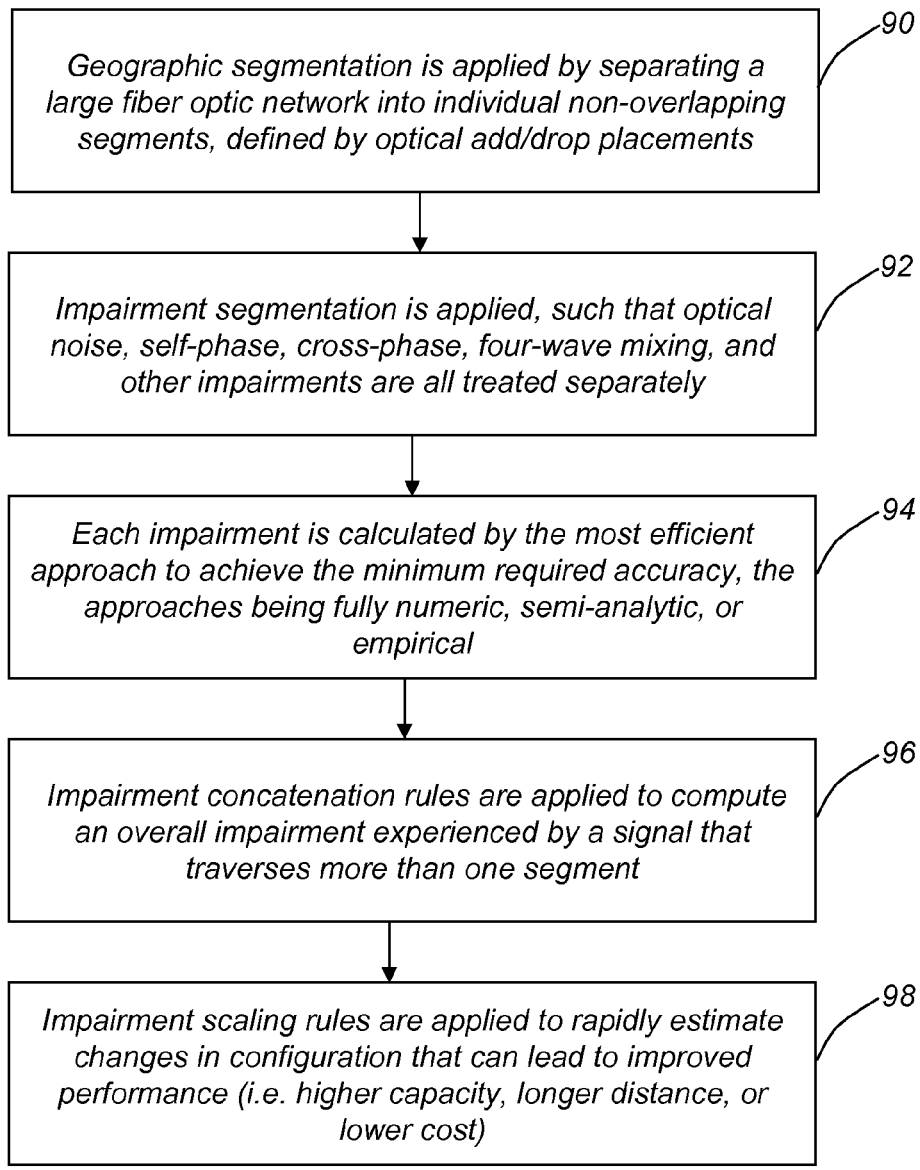
FIG. 4 is a flowchart illustrating an exemplary embodiment of the method for the performance analysis of fiber optic networks of the present invention.
Figure 5:
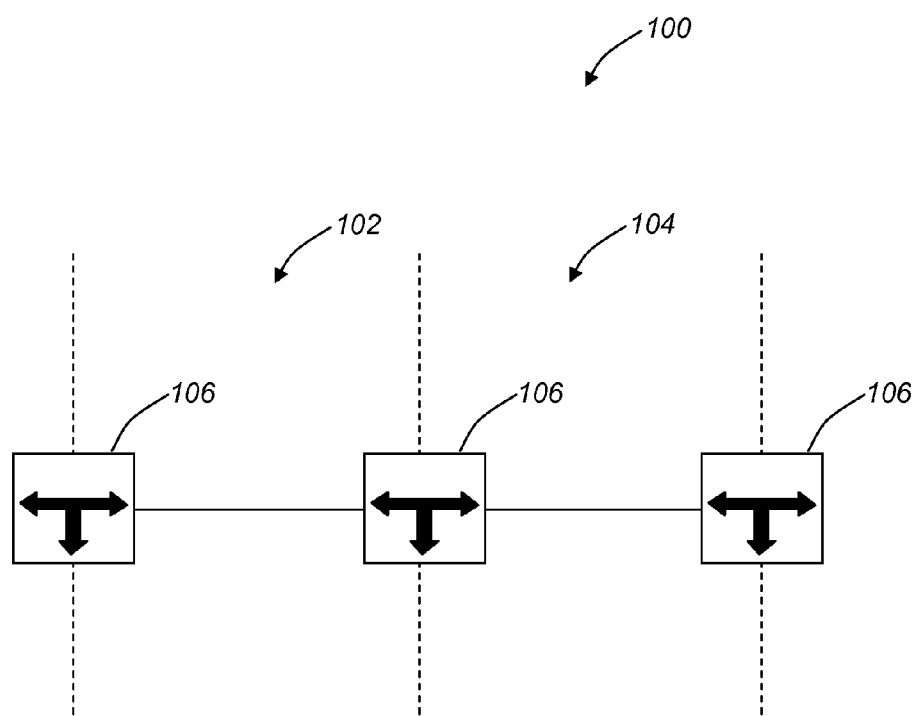
FIG. 5 is a schematic diagram illustrating an exemplary embodiment of a fiber optic network including OADMs to which geographic segmentation into non-overlapping segments is applied as defined by the placement of the OADMs.

Again, the present invention provides novel approaches to signal propagation modeling that utilize the following as illustrated in FIG. 4: 1) geographic segmentation is applied by separating a large fiber optic network into individual non-overlapping segments, defined by optical add/drop placements (step 90); 2) impairment segmentation is applied, such that optical noise, self-phase, cross-phase, four-wave mixing, and other impairments are all treated separately (step 92); 3) each impairment is calculated by the most efficient approach to achieve the minimum required accuracy, the approaches being fully numeric, semi-analytic, or empirical (step 94); 4) impairment concatenation rules are applied to compute an overall impairment experienced by a signal that traverses more than one segment (step 96); and 5) impairment scaling rules are applied to rapidly estimate changes in configuration that can lead to improved performance (i.e. higher capacity, longer distance, or lower cost) (step 98). FIG. 5 illustrates an exemplary embodiment of a fiber optic network 100 with geographic segments 102, 104. The fiber optic network 100 includes OADMs 106. As described herein, geographic segmentation is applied by separating the fiber optic network 100 to include individual non-overlapping segments, i.e. the geographic segments 102, 104. These individual non-overlapping segments are defined by the OADM placements.

Figure 3A:
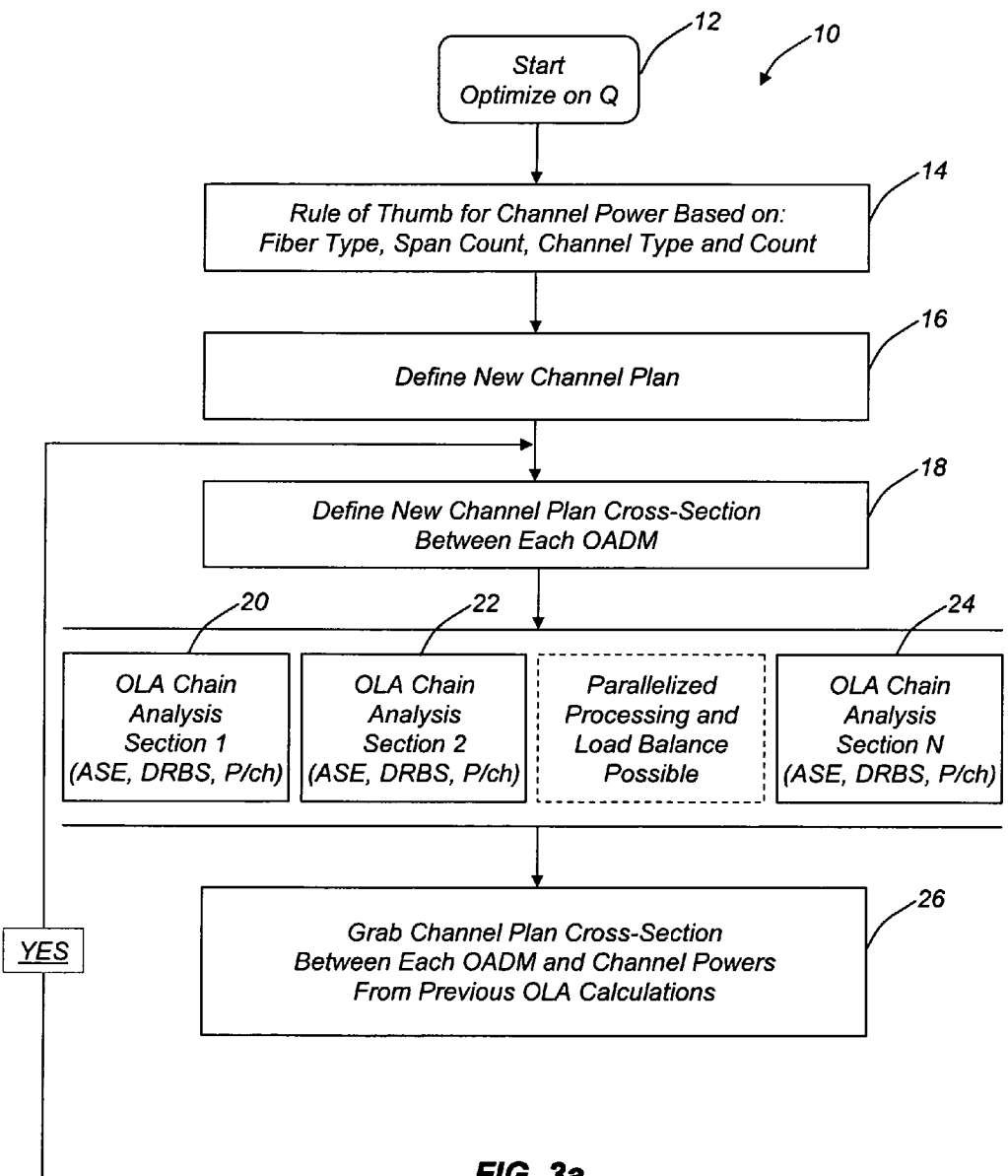
FIG. 3a is a flowchart illustrating a portion of one exemplary embodiment of the method for the performance analysis of fiber optic networks of the present invention.

Referring to FIG. 3a, in one exemplary embodiment, the method 10 for the performance analysis of fiber optic networks of the present invention comprises an optimization based on quality (Q) (Block 12). First, a rule of thumb for setting channel power is applied, the rule of thumb based on fiber type, span count, channel type and count, and/or the like (Block 14). Second, a new channel plan is defined (Block 16). Third, a new channel plan cross-section between each OADM is defined (Block 18). Next, an optical line amplifier (OLA) chain analysis is performed for sections 1, 2, ..., N (including ASE, double Rayleigh backscattering (DRBS), channel power (P/ch), and/or the like) (Blocks 20, 22, 24). Optionally, parallelized processing is performed. Computational load balancing can also be utilized.

Figure 3B:
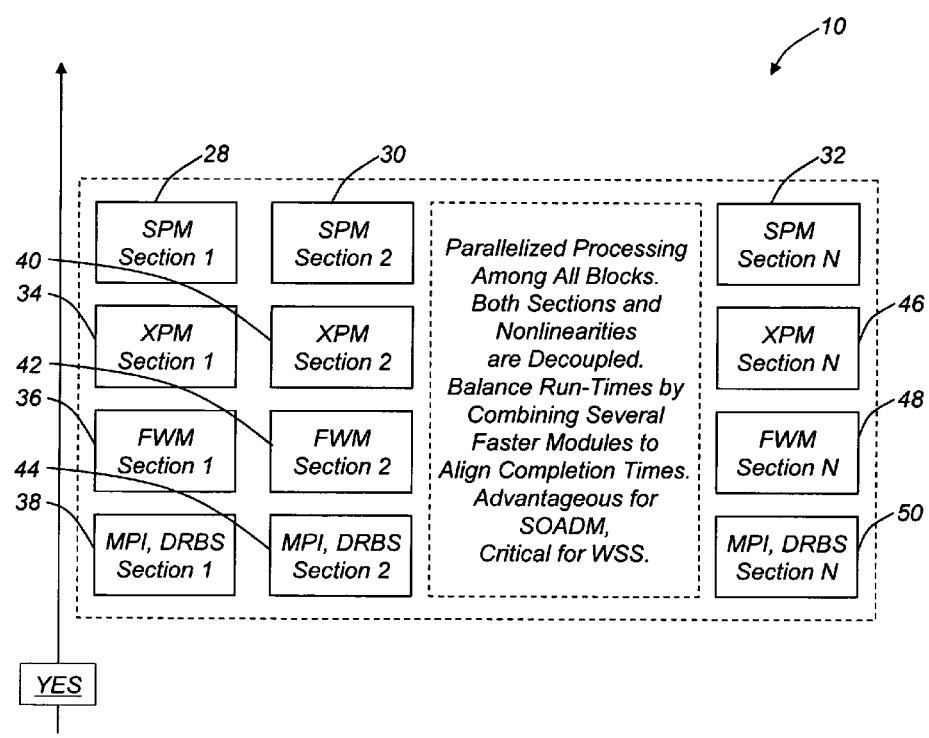
FIG. 3b is a flowchart illustrating another portion of one exemplary embodiment of the method for the performance analysis of fiber optic networks of the present invention.

Referring to FIG. 3b, the method 10 then includes the application of both geographic and impairment segmentation (i.e. sections and impairments are decoupled). This results in the following blocks, SPM Section 1 28, SPM Section 2 30, ..., SPM Section N 32, XPM Section 1 34, FWM Section 1 36, MPI-DRBS Section 1 38, XPM Section 2 40, FWM Section 2 42, MPI-DRBS Section 2 44, ... XPM Section N 46, FWM Section N 48, and MPI-DRBS Section N 50. Optionally, parallelized processing is performed. Run-times can also be balanced by combining several faster modules together to align completion times.

Figure 3C:
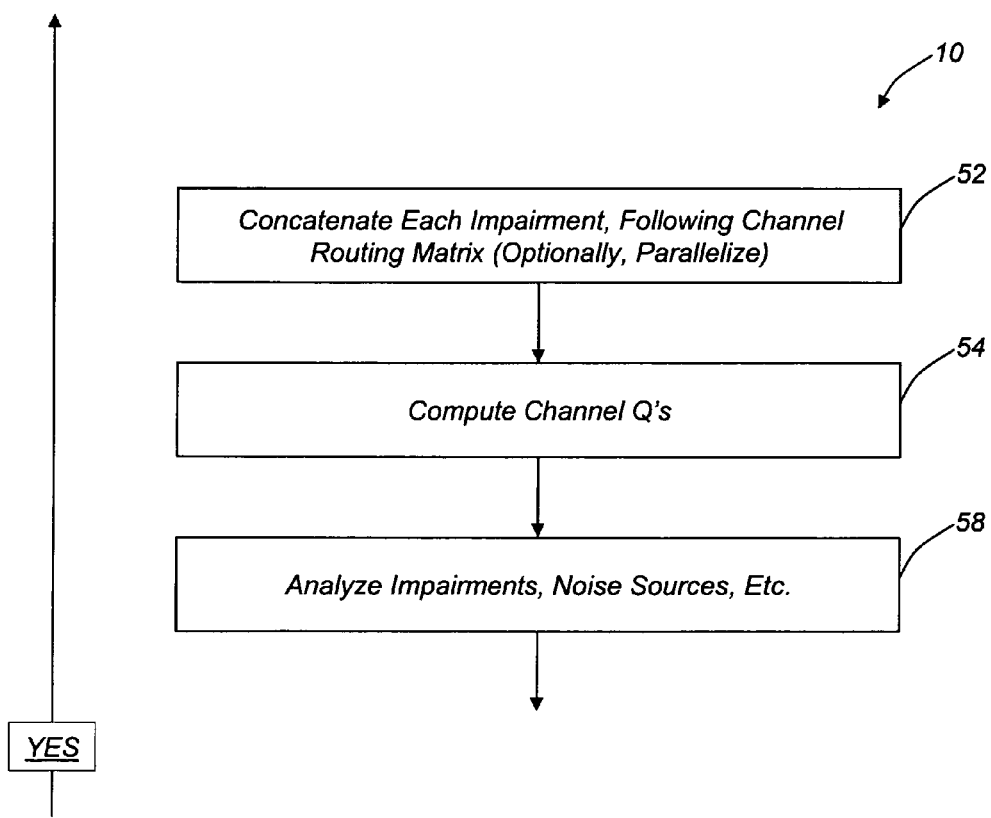
FIG. 3c is a flowchart illustrating a further portion of one exemplary embodiment of the method for the performance analysis of fiber optic networks of the present invention.

Referring to FIG. 3c, the method 10 then includes concatenating each effect, following a channel routing matrix (Block 52). Optionally, parallelized processing is performed. Once the effects are concatenated, the channel Q's are computed (Block 54), and impairments, noise sources, and/or the like are analyzed (Block 58).

Figure 3D:
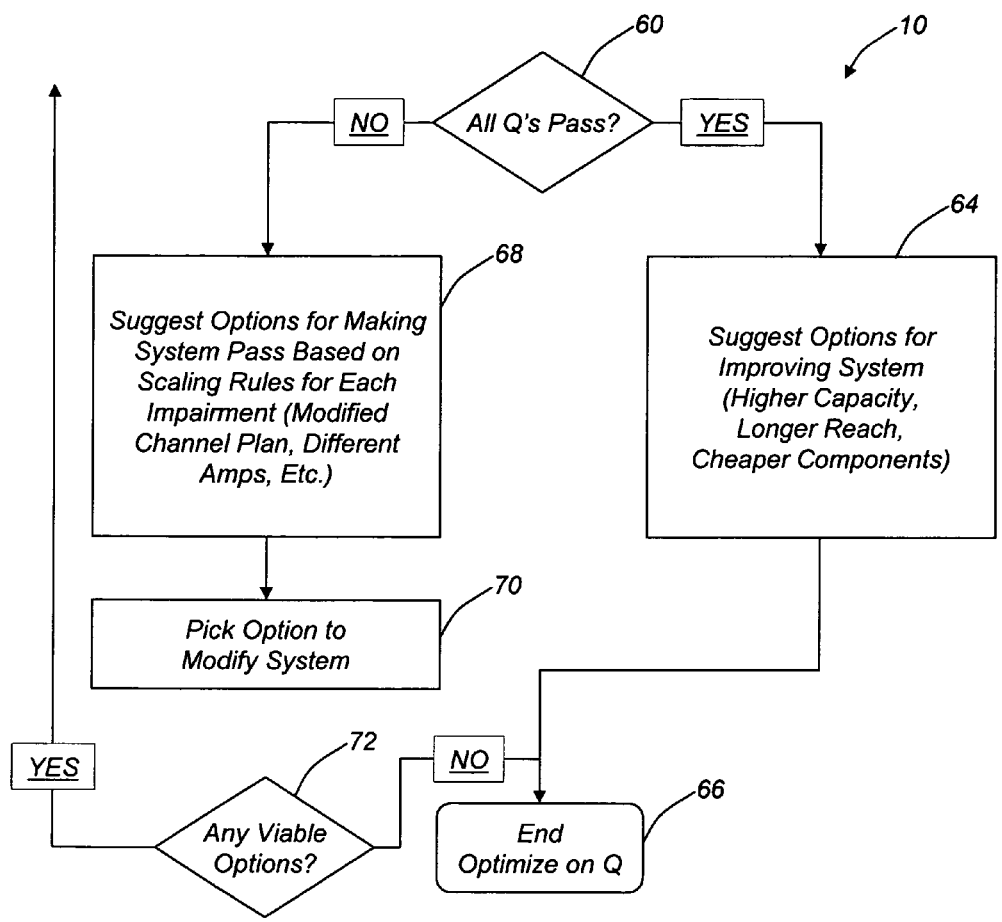
FIG. 3d is a flowchart illustrating a still further portion of one exemplary embodiment of the method for the performance analysis of fiber optic networks of the present invention.

Referring to FIG. 3d, the method 10 then includes determining whether all channel Q's pass (Block 60). If yes, options are suggested for improving the overall system (i.e. higher capacity, longer reach, cheaper components, and/or the like) (Block 64), and the final result is an optimization based on Q (Block 66). If no, options are suggested for making the overall system pass based on scaling rules for individual impairments (i.e. modified channel plan, different amps, and/or the like) (Block 68), and one or more of these options are selected for modifying the overall system (Block 70). If there is a viable option (Block 72), then the system configuration is modified accordingly and the method is repeated. If there is not a viable option (Block 72), then the final result is a sub-optimal outcome based on Q (Block 66).

It should be noted that the any/all of the methods described above can be implemented as one or more algorithms resident in software on a desktop computer or the like, as appropriate.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims.

What is claimed is:

1. A method for the performance analysis of fiber optic networks, the method comprising:
   performing signal propagation modeling for a fiber optic network of interest by:
   providing a computer with signal propagation modeling data related to the fiber optic network of interest for calculation of impairments;
   separating the fiber optic network into a plurality of segments comprising individual non-overlapping segments defined by one or more optical add/drop placements;

performing an optical line amplifier (OLA) chain analysis on the computer of each of the plurality of segments based upon the modeling data;
performing an impairment analysis on the computer of each of the plurality of segments based upon the statistical modeling data associated with fibers on each of the plurality of segments to provide a signal propagation model through the fiber optic network of interest, wherein the impairment analysis is performed separately for each of the plurality of segments;
calculating, using software resident in a computer, the impairments for a signal in the fiber optic network based upon the impairment analysis of each of the plurality of segments, wherein, if the signal traverses more than one of the plurality of segments, calculating the impairments for the signal as a concatenation of the impairments for the more than one of the plurality of segments; and
if impairments of one segment of the plurality of segments change, reapplying the one or more concatenation rules only adjusting the one segment to compute a revised overall impairment.

2. The method of claim 1, wherein the optical line amplifier (OLA) chain analysis of each of the plurality of segments is performed in a parallel manner.

3. The method of claim 1, wherein the optical line amplifier (OLA) chain analysis of each of the plurality of segments is performed with load balancing.

4. The method of claim 1, wherein the impairment analysis of each of the plurality of segments is performed in a parallel manner.

5. The method of claim 1, wherein the impairment analysis of each of the plurality of segments is performed with load balancing.

6. The method of claim 1, wherein the impairments comprise impairments selected from the group consisting of Optical Amplified Spontaneous Emission (ASE) noise accumulation associated with optical amplifiers, Self-Phase Modulation (SPM) associated with a single channel fiber nonlinearity, Cross-Phase Modulation (XPM) associated with a fiber nonlinearity coupling multiple adjacent channels, Four-Wave Mixing (FWM), Stimulated Raman Scattering (SRS), Multi-Path Interference (MPI), and Polarization Mode Dispersion (PMD).

7. The method of claim 1, further comprising selecting and utilizing an initial per channel power in the fiber optic network.

8. The method of claim 7, further comprising selecting and utilizing a predetermined channel plan for the fiber optic network.

9. The method of claim 8, further comprising selecting and utilizing a predetermined channel plan cross-section for each of the plurality of segments of the fiber optic network.

10. The method of claim 9, wherein performing the optical line amplifier (OLA) chain analysis of each of the plurality of segments provides a plurality of channel powers for the fiber optic network.

11. The method of claim 1, further comprising concatenating results obtained from performing the impairment analysis of each of the plurality of segments.

12. The method of claim 11, wherein concatenating the results obtained from performing the impairment analysis of each of the plurality of segments is performed in a parallel manner.

13. The method of claim 1, further comprising computing channel qualities (Q's) for the fiber optic network.

14. The method of claim 1, further comprising applying scaling rules for one or more of the impairments in order to determine if the channel qualities (Q's) are improved thereby.

15. The method of claim 1, wherein the signal traverses more than one of the plurality of segments, and further comprising:
changing the signal in one of the plurality of segments; and
recalculating the impairments by changing the impairment analysis in the one of the plurality of segments based on the changed signal and performing the concatenation of the impairments with the recalculated impairment analysis in the one of the plurality of segments and the previously determined impairment analysis in remaining segments of the more than one of the plurality of segments.

16. The method of claim 15, wherein the performing an impairment analysis comprises a computer-based computational method comprising a fully numeric method, a semi-analytic method, or an empirical method.

17. A computer implemented fiber optic modeling method, comprising:
performing signal propagation modeling for a fiber optic network by:
segmenting the fiber optic network by separating the fiber optic network into a predetermined number of non-overlapping segments defined by one or more optical add/drop placements;
statistically modeling a plurality of impairments for each of the predetermined number of non-overlapping segments using software resident in a computer;
calculating an overall impairment for a signal through the fiber optic network utilizing a concatenation through one or more concatenation rules of the statistically modeled plurality of impairments for each of the predetermined number of non-overlapping segments over which the signal traverses; and
based on a change related to a particular segment, recalculating a revised overall impairment for the signal based on the change, wherein the one or more concatenation rules are configured to enable recalculation of the revised overall impairment based on changes in the particular segment through recalculating the particular segment and reapplying the concatenation rules.

18. The computer implemented fiber optic modeling method of claim 17, wherein the recalculating is performed with previously calculated impairments for segments other than the particular segment.

19. A system for fiber optic modeling, comprising:
a computer comprising data related to a fiber optic network, wherein the computer is configured to perform signal propagation modeling for the fiber optic network by:
segmenting the fiber optic network by separating the fiber optic network into a predetermined number of non-overlapping segments defined by one or more optical add/drop placements;
statistically modeling a plurality of impairments for each of the predetermined number of non-overlapping segments using software resident in the computer;
calculating an overall impairment for a signal through the fiber optic network utilizing a concatenation through one or more concatenation rules of the statistically modeled plurality of impairments for each of the predetermined number of non-overlapping segments over which the signal traverses; and based on a change related to a particular segment, recalculating a revised overall impairment for the signal based on the change, wherein the one or more concatenation rules are configured to enable recalculation of the revised overall impairment based on changes in the particular segment through recalculating the particular segment and reapplying the concatenation rules.

20. The system of claim 19, wherein the recalculation is performed with previously calculated impairments for segments other than the particular segment.

* * * * *